United States Patent
Sugaya

(10) Patent No.: US 6,608,824 B1
(45) Date of Patent: Aug. 19, 2003

(54) TRANSMISSION CONTROLLING METHOD AND TRANSMITTING APPARATUS

(75) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/432,566

(22) Filed: Nov. 12, 1999

(30) Foreign Application Priority Data

Nov. 13, 1998 (JP) ............................................. 10-323848

(51) Int. Cl.[7] ................................................. H04J 3/00
(52) U.S. Cl. ...................................................... 370/337
(58) Field of Search ................................ 370/335–337, 370/280, 311, 321–326, 347–350, 522, 331, 416–427, 395, 455; 455/343, 450, 433, 464; 710/25

(56) References Cited

U.S. PATENT DOCUMENTS

| | | | | |
|---|---|---|---|---|
| 4,442,485 A | * | 4/1984 | Ota et al. ...................... | 710/57 |
| 5,140,582 A | * | 8/1992 | Tsuboi et al. ................. | 370/416 |
| 5,438,665 A | * | 8/1995 | Taniai et al. ................... | 710/25 |
| 5,511,217 A | * | 4/1996 | Nakajima et al. ............ | 709/100 |
| 5,590,133 A | * | 12/1996 | Billstrom et al. ............ | 370/349 |
| 5,602,852 A | * | 2/1997 | Shiobara ....................... | 370/455 |
| 5,754,626 A | * | 5/1998 | Otonari ......................... | 370/347 |
| 6,067,121 A | * | 5/2000 | Shigihara ...................... | 348/473 |

\* cited by examiner

*Primary Examiner*—Kwang Bin Yao
*Assistant Examiner*—Prenell Jones
(74) *Attorney, Agent, or Firm*—Jay H. Maioli

(57) ABSTRACT

In a transmission controlling method where an access for transmission between a plurality of communicating stations is executed based on control information transmitted from the control station, when renewing the control information, the control station transmits renewed control information as well as its renewed timing information prior to the renewed timing and the communicating stations renew the control information to the received control information with the timing set by the received timing information. Therefore, when a control station is provided to control transmission within a network, the renewal of transmission control information can be performed satisfactorily by a simple control.

7 Claims, 13 Drawing Sheets

TRANSMISSION CONTROLLING METHOD AND TRANSMITTING APPARATUS

BACKGROUND OF THE INVENTION

1. Field of the Invention

The present invention relates to a transmission controlling method preferably applicable to a case where, for example, various kinds of information are transmitted over a radio signal, thereby constructing a local area network (LAN) among plural equipments, a transmission control apparatus to which this controlling method is applied and a transmitting apparatus whose transmission is controlled by this transmission control apparatus.

2. Description of the Related Art

In the past, when constructing a local area network within a comparatively narrow area such as a household and an office or the like, so that, between plural equipments such as various kinds of video equipments, a personal computer system and its peripheral devices or the like, data handled by these equipments can be transmitted, it may be arranged that, instead of directly connecting between the respective equipments through some signal lines, a transmitting/receiving apparatus of the radio signal (radio transmitting apparatus) is connected to each equipment, thus allowing the data to be transmitted by radio transmission.

Constructing the local area network by radio transmission eliminates the necessity to directly connect the respective equipments by signal lines, etc., which enables the system structure to be simple.

Incidentally, when a plurality of the radio transmitting apparatus are prepared to construct the local area network, if signals are simultaneously transmitted from the plurality of transmitting apparatus by using the same transmission band, a transmission error may occur. For this reason, it is necessary to control the access in communication between the respective transmitting apparatus within the network by some means.

As concerns an access controlling method known from the past, for example, in case of a small-scale radio network, there is a method in which a central transmitting apparatus (root node) in the star connection is made a control station and the control station manages in a unified manner the communication among the respective transmitting apparatus (node) within the network.

Incidentally, the radio network system having such a control station determined involves a problem in which, when a need of renewing management information transmitted from the control station arises, it is complicated to process for transmitting securely the management information to each terminal station.

Specifically, for example, in a conventional system, in order to confirm that renewal information of the management information from the control station has reached each terminal station, each terminal station is caused to reply with confirming information (ACK signal) for confirming completion of connection. In other words, when renewing the network management information, the control station transmits simultaneously the renewal information to all the terminal stations by broadcast transmission and thereafter each terminal station is caused to return the confirming information when it has received correctly the renewal information. The returned confirming information is judged by the control station. These processings involve a problem in which transmission traffic for processing to transmit the control information becomes redundant. Particularly, there is a fear that an enormous time is consumed to return the confirming information over a radio transmission path whose quality is poor.

If it takes time to transmit this control information, for example, in case of a communication structure having a management information transmitting area for the network management and an information transmitting area for transmitting real information, when the renewal information is to be transmitted by using this information transmitting area, it will take a long time until an information transmission using the information transmitting area is started by the renewed control information.

Therefore, in recent years, usefulness of the transmission controlling method is being recognized, in which a so-called connectionless protocol that prior to the information transmission no establishment of transmission path takes place is used on the radio transmission path. However, in the case of the transmission controlling method using the connectionless protocol, because any information is broadcast on the radio transmission path while no assurance of connection is obtained, there is a danger that transmissions from the plural stations collide one another to cause the transmission error.

When the control station instructs, using the management information transmitting area, to renew information on a utilizing method of the transmission path on the information transmitting area, communicating stations which fail to receive that management information cannot renew the utilizing method of transmission path on the information transmitting area.

Moreover, when a communication network configuration is considered, in which each terminal station has a plurality of directive antennas and an equipment making an antenna diversity operation to switch the antenna used for transmission or reception depending on a communicating partner, it cannot be assured that an optimum antenna is selected at a timing when the network management information is transmitted, thus causing a need to define the strict timing. Furthermore, for an always moving station, the optimum antenna will change whenever it moves and so the renewal of information with a specific timing becomes complicated.

Also, when any transmission controlling method may be employed, it needs some time to decode those transmission management information and thus it is very difficult to renew the transmission management information in an instant. Particularly, in transmission subjected to digital modulation/demodulation, the error correction is often performed in order to improve the line quality of transmission path and so it takes a time to decode these information also. This makes it difficult for each terminal station to renew simultaneously the management information.

SUMMARY OF THE INVENTION

An object of the present invention is to make it possible to renew the transmission control information satisfactorily under simple processing when performing the transmission control within the network by providing the control station.

A transmission controlling method according to the present invention is arranged so that, when the control information to be set by the control station is to be renewed, the control station may transmit the control information to be renewed as well as its renewed timing information prior to the renewed timing and the communicating stations renew the control information to the received control information with the timing set by received timing information.

According to this transmission controlling method, in each communicating station, the previously transmitted renewal information is set and then the control information is renewed simultaneously by the set renewal information with the specified timing.

A transmission control apparatus according to the present invention comprises a renewal information producing means for producing the renewal information of the control information which controls access within the network, a timing specifying means for giving timing information which specifies a timing for renewing with the renewal information produced by the renewal information producing means, and a transmitting means for transmitting the renewal information produced by the renewal information producing means as well as the timing information given by the time specifying means.

According to this transmission control apparatus, when controlling other transmitting apparatus within the network to renew the control information, it is enabled to specify the timing of renewing the control information.

A transmitting apparatus according to the present invention comprises a communicating means for transmitting and receiving to and from other transmission apparatus as well as for receiving the control information from a control apparatus, and a control means for estimating the control information received by the communicating means to cause the communicating means to transmit or receive and when the received control information contains renew information and timing information, renew the control information to the renewal information at a timing specified by the timing information.

According to the transmitting apparatus, it is possible to renew the control information by the received renewal information at a timing specified from the control apparatus.

DESCRIPTION OF THE PREFERRED EMBODIMENTS

An embodiment of the present invention will be described below with reference to FIG. 1 to FIG. 13.

Figure 1:
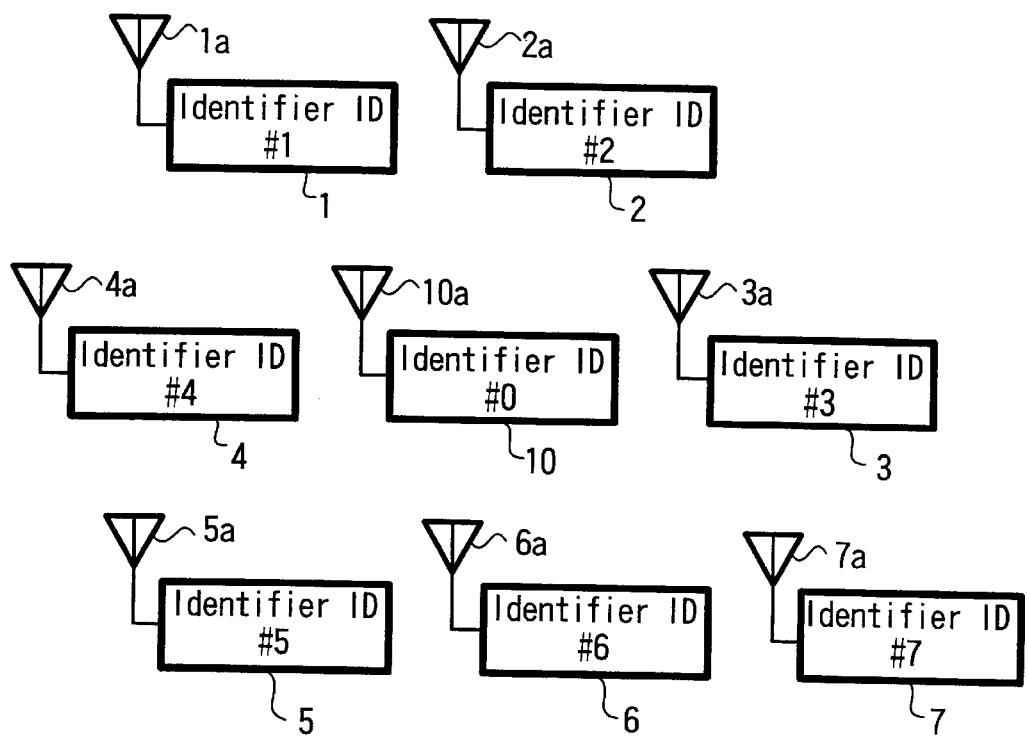
FIG. 1 is a structural diagram showing an example of communication system according to an embodiment of the present invention.

The present embodiment is such that the invention is applied to a network system constructed as a system transmitting and receiving video data, audio data, computer data and so on, for example, within a household, a comparatively small-scale office and the like. Referring to FIG. 1, the system structure of the present embodiment will be described first. In the network system of the present embodiment, the maximum number of radio transmitting apparatus forming the network is predetermined. For example, the network can be constructed by the sixteen radio transmitting apparatus at its maximum. FIG. 1 shows a state where eight radio transmitting apparatus 1 to 7 and 10 are arranged. The respective radio transmitting apparatus 1 to 7, 10 are respectively connected with antennas 1a to 7a, 10a for transmission and reception. The respective transmission apparatus 1 to 7, 10 are connected individually with various processing units (not shown) such as a video signal reproducing unit, a monitor unit, a computer unit, a printer unit and the like. When data transmission is needed between these processing units, the data transmission is performed via the connected radio transmitting apparatus.

The eight radio transmitting apparatus 1 to 7, 10 function as nodes that are communicating stations and are individually assigned beforehand an identifier ID that is an identification number of each apparatus. In other works, the transmitting apparatus 10 is assigned #0 as the identifier ID and the transmitting apparatus 1 to the transmitting apparatus 7 are assigned the identifiers ID from #1 to #7 in sequence.

In this case, the system structure is such that one optional radio transmitting apparatus within the network system is defined as the root node functioning as the center control station and radio communication between the respective nodes is carried out under the polling control from that control station. Basically, it is ideal to employ as the control station a radio transmitting apparatus arranged at a position where it can communicate by radio directly with all other communicating stations. In this embodiment, the radio transmitting apparatus 10 of identifier ID #0 arranged nearly at the center of the network system is defined as the central control station and this central root node controls other peripheral terminal stations, which forms the so-called star connection structure.

In the present embodiment, the radio transmitting apparatus 7 of identifier ID #7 is arranged at a position where it cannot communicate by radio directly with the radio transmitting apparatus 10 being the central control station. The radio transmitting apparatus 7 is arranged at a position where it can communicate by radio directly with the radio transmitting apparatus 3 of identifier ID #3 and the radio transmitting apparatus 6 of identifier ID #6. Accordingly, it is arranged so that the transmission of control information from the central control station to the radio transmitting apparatus 7 of identifier ID #7 may be carried out by relay of the radio transmitting apparatus 3 of identifier ID #3 or the radio transmitting apparatus 6 of identifier ID #6.

Figure 2:
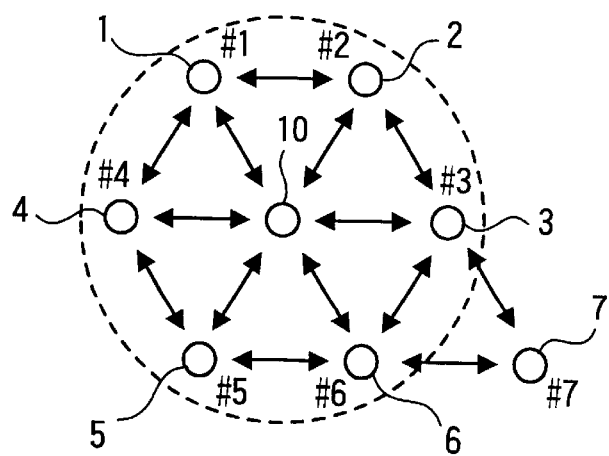
FIG. 2 is an explanatory diagram showing an example of physical topology map according to an embodiment of the present invention.

FIG. 2 shows a physical topology map representing a communication state between the respective stations under the arrangement conditions of each communicating station and the control station in the present embodiment, in which the direct communication can be made between the communicating stations shown connected by arrow marks. In this embodiment, each of the communicating stations 1 to 7, 10 is basically in a condition to communicate directly with only the adjacent communicating stations. For example, the communicating station 1 of identifier ID #1 can communicate directly with only the communicating stations 2, 4, 10 of identifier ID #2, #4, #0 which surround the communicating station 1. The same is true of other communicating stations. As concerns the nearly centered communicating station (control station), it can communicate directly with all other communicating stations 1 to 6 except the communicating station 7 of identifier ID #7. Further, when communication is to be made between the communicating stations which cannot communicate directly with each other, another communicating station relays transmitted data to process for transmission.

Figure 3:
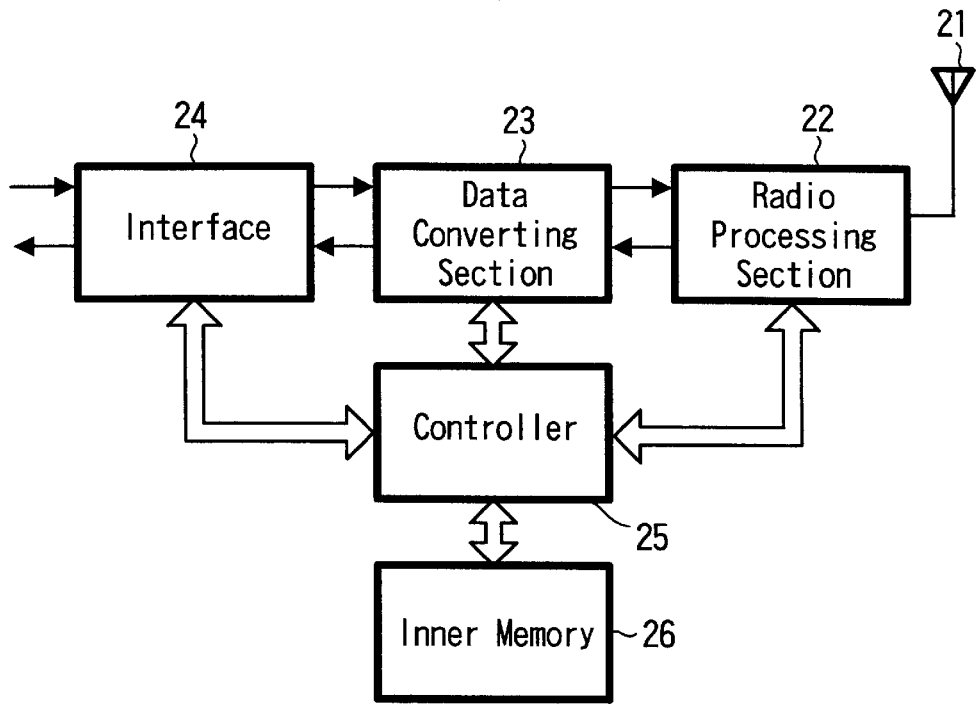
FIG. 3 is a block diagram showing an example of the structure of transmitting apparatus according to an embodiment of the present invention.

An example of the structure of radio transmitting apparatus 1 to 7, 10 forming each communicating station is shown in FIG. 3. In this embodiment, each of the radio transmitting stations 1 to 7, 10 has basically a common structure (Only a controlling structure to function as the central control station differs from other communicating station.) and includes an antenna 21 for transmission/reception and a radio processing section 22 connected to this antenna 21 to process for radio transmission/radio reception, thus forming a structure capable of radio transmission between other transmission apparatus. In this case, as a transmission system on which the radio processing section 22 in the present embodiment transmits and receives, for example, the transmission system by multicarrier signal termed an OFDM (Orthogonal Frequency Division Multiplex) system is employed, and as a frequency used for transmission/reception, for example, a very high frequency band (e.g. five GHz zone) is employed. Additionally, in the present case, a transmitting output is set comparatively weak and when used indoors, for example, if is set to be an output on the level of enabling radio transmission over a relatively short distance from several meters to several ten meters or so.

Moreover, a data converting section 23 is provided which makes data conversion of signals received at the radio processing section 22 and data conversion of signals transmitted from the radio processing section 22. It is arranged that converted data by this data converting section 23 is supplied to a processing unit connected through an interface section 24 and data supplied from the connected processing unit is supplied to the data converting section 23 through the interface section 24 for processing to convert. Data transmission between the interface section 24 and the processing unit connected to the interface section 24 is carried out, for example, on a system defined as an IEEE1394 standard.

It is arranged that each section in the radio transmitting apparatus performs the processing under the control of a controller 25 formed by a microcomputer and the like. In this case, when the received signal at the radio processing section 22 is the control signal, the received control signal is supplied to the controller 25 through the data converting section 23 and the controller 25 sets each section in condition indicated by the received control signal. Also, as to the control signal transmitted from the controller 25 to other transmitting apparatus, it is supplied from the controller 25 to the radio processing section 22 through the data converting section 23 for transmitting by radio. If the received signal is a synchronizing signal, the controller 25 decides the received timing of synchronizing signal and sets a frame cycle based on the synchronizing signal to execute the communication control processing in that frame cycle. Further, an inner memory 26 is connected to the controller 25 and data necessary for the communication control is stored in the inner memory 26.

In case of the radio transmitting apparatus operating as the central control station, the controller 25 of that radio transmitting apparatus is arranged to produce the control information, whereas in case of the radio transmitting apparatus operating as the terminal station, it is arranged that the control information transmitted from the central control station is stored in the memory 26 and the controller 25 performs the communication control based on the stored control information.

Furthermore, the controller 25 of the present embodiment is constructed to operate as a counter for setting a renewing time described later on. The count value of this counter is arranged to be counted down by one count value each time the frame cycle changes by one cycle.

In addition, the radio transmitting apparatus forming the central control station and the terminal station in the present embodiment may be constructed as fixed radio transmitting apparatus whose installed position is fixed, or may be constructed as portable radio transmitting apparatus used with a moving object. In case of the portable radio transmitting apparatus, the topology map shown in FIG. 2 will change from time to time depending on the positional relation on that occasion.

Figure 4:
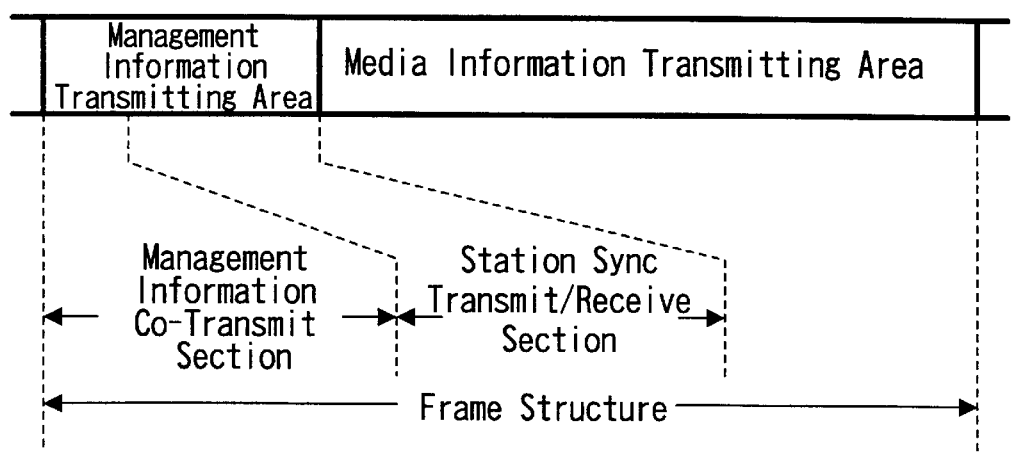
FIG. 4 is an explanatory diagram showing an example of frame structure according to an embodiment of the present invention.

FIG. 4 shows a structure of signal transmitted between the respective stations (radio transmitting apparatus 1 to 7, 10) within the network system of the present embodiment. The present example is arranged to define a frame cycle for transmitting data. In other words, as shown in FIG. 4, one frame period is defined by a predetermined period of time and a predetermined section at the head of that one frame period is defined as a management information transmitting area, in which area there are provided a management information co-transmit section and a station sync transmit/receive section. Further, a section following the management information transmitting area in each frame is defined as a media information transmitting area, on which area various kinds of data that are those actually desired to transmit between the respective stations (payload data) are transmitted.

Data transmission on the media information transmitting area is performed on a random access system by a dispersive control of each communicating station or under the access control of the central control station. The access control by the central control station is performed, for example, under the polling control from the central control station. This polling control processing is such that each terminal station is called in turn by a palling response request signal from the central control station and transmission is performed to each terminal station in turn one by one.

The communicating station of identifier ID specified by the polling response request signal processes immediately to transmit data when received the polling response request signal, if it has data to be transmitted.

In addition, the data transmission on the media information transmitting area may be performed by a radio transmission, instead of such transmission by polling, in which the media information transmitting area in one frame is previously divided into a plurality of slots and each slot thus divided is assigned to the terminal stations requesting to transmit under the control of central control station.

As concerns the transmission processing on this occasion, it may be considered, for example, to use selectively, depending on a sort of transmitted data, a data transfer according to an asynchronous transfer mode and a data transfer according to an isochronous transfer mode. Of these asynchronous transfer mode and isochronous transfer mode, the asynchronous transfer mode is used for transmitting comparatively short data such as control data or the like, whereas the isochronous transfer mode is used for transmitting a large amount of data requiring a realtime transfer such as video data, audio data and the like. For example, the system prescribed as the IEEE 1394 standard can be used for the transmission control system in which such transfer modes are prepared. It is preferable to use for the asynchronous transfer mode, e.g. the transmitting method according to the polling control and to perform for the isochronous transfer mode, e.g. the assignment transmission by dividing into slots.

On the management information co-transmit section in each frame is arranged the central control station 10 to transmit the management information which is common to the system. This management information includes, for example, synchronizing data necessary for frame synchronization within the network system, identification number data unique to the network system, topology map data within the network, transmission path utilization information in media information transmitting area, and so on. These management information are simultaneously transmitted to each station within the network.

Figure 5:
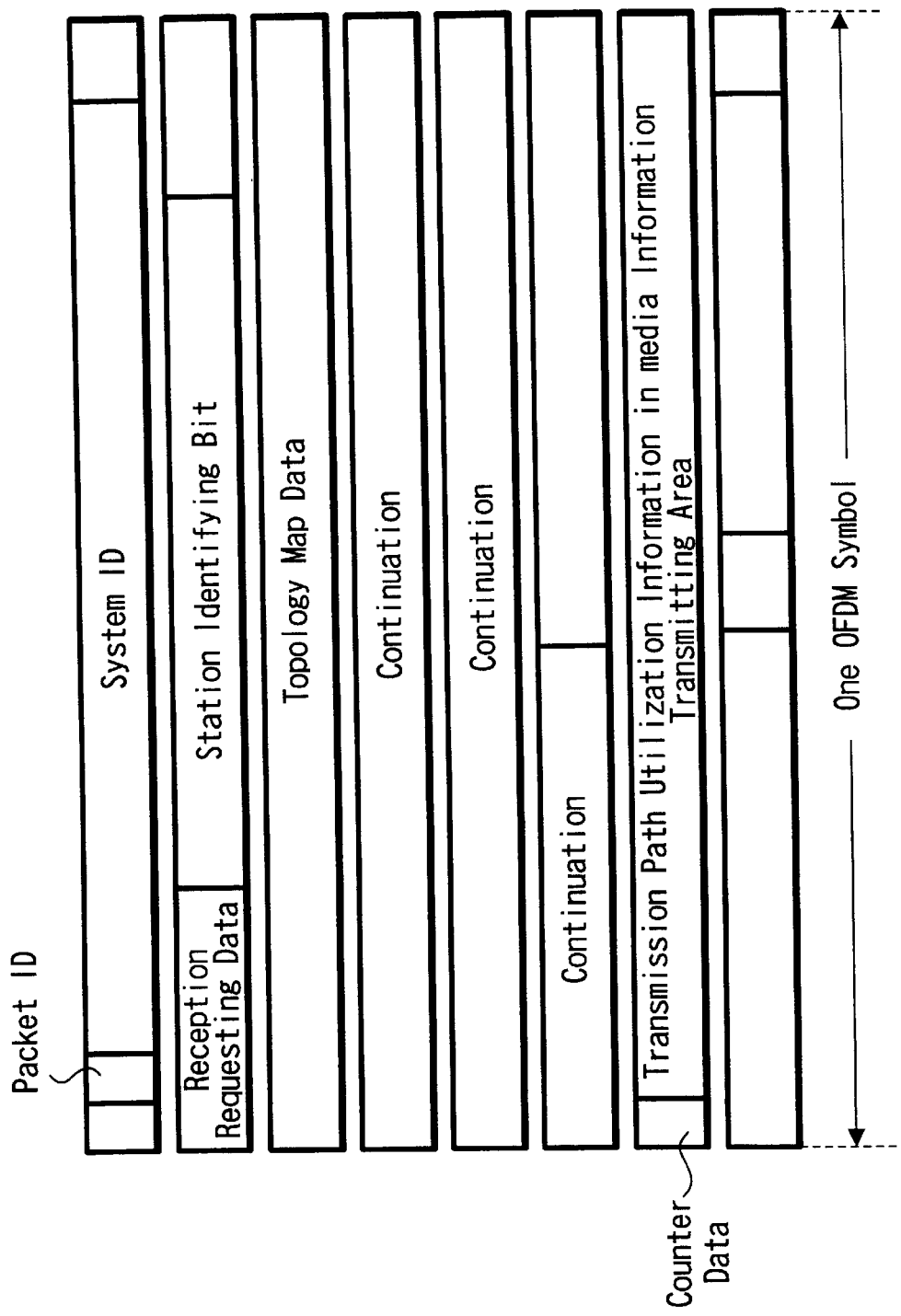
FIG. 5 is an explanatory diagram showing an example of data structure in the management information co-transmit section according to an embodiment of the present invention.

FIG. 5 shows an example of data structure in the management information co-transmit section according to the present embodiment. The management information co-transmit section is comprised of, e.g. eight OFDM symbols. Packet ID, system ID, reception requesting data, station identifying bit, topology map data, counter data, transmission path utilization information in the media information transmitting area, error correction code CRC, etc. are arranged in a predetermined number of bits on the respective data. Additionally, in the management information co-transmit section, there also exists a section where data to be arranged is undefined. Further, the counter data is data to specify the due timing for the terminal station within the network.

Figure 6:
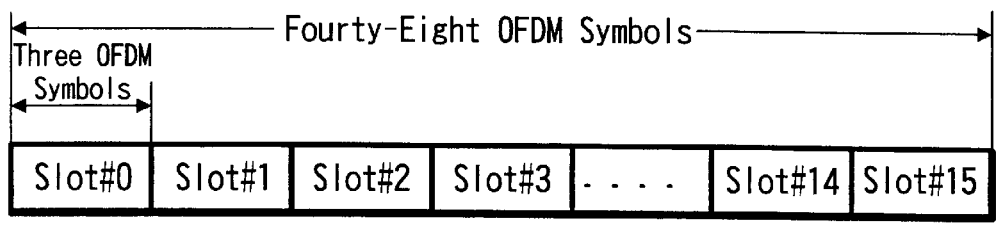
FIG. 6 is an explanatory diagram showing an example of structure of the station sync transmit/receive section according to an embodiment of the present invention.

FIG. 6 shows an example of structure of the station sync transmit/receive section according to the present embodiment. The station sync transmit/receive section within one frame has, as shown in FIG. 6, a predetermined number (herein, sixteen) of slots provided at an equal interval. These sixteen slots within one frame are allotted to sixteen communicating stations in this network system, respectively. One slot is comprised of, e.g. three OFDM symbols. In this slot allotment, for example, from the first slot in sequence are arranged a slot for communicating station of identifier ID #0, a slot for communicating station of identifier ID #1, a slot for communicating station of identifier ID #2,—and a slot for communicating station of identifier ID #15. Using the slot allotted to each communicating station, the communicating station associated with that slot transmits the station sync signal. In this embodiment, because eight communicating stations constitute the network system, eight slots (herein, eight slots from the head) are employed and the rest of slots are not employed (that is, no data is transmitted).

Figure 7:
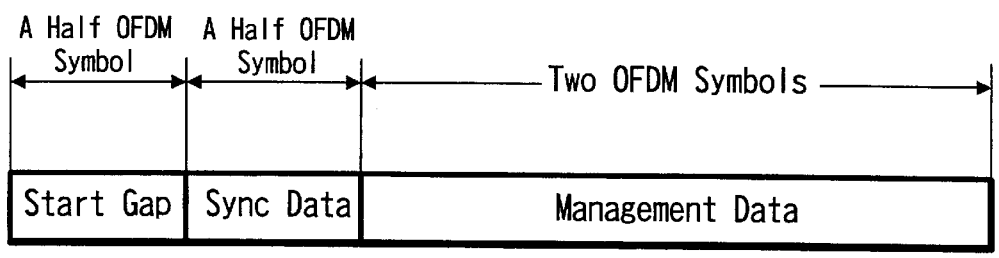
FIG. 7 is an explanatory diagram showing an example of data structure of each slot in the station sync transmit/receive section according to an embodiment of the present invention.

The station sync signal transmitted for the respective slot period is constructed, for example, as shown in FIG. 7. In other words, it is comprised of a start gap (a period of time without data transmission) having 0.5 OFDM symbol period, sync data having 0.5 OFDM symbol period, and management data having 2 OFDM symbol period.

Figure 8:
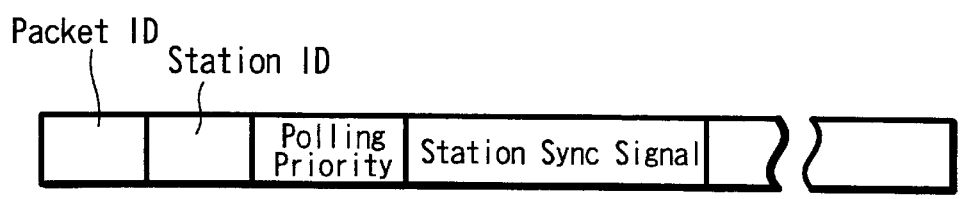
FIG. 8 is an explanatory diagram showing an example of the management data of each slot in the station sync transmit/receive section according to an embodiment of the present invention.

FIG. 8 shows an example of a structure of the management data in the 2 OFMD symbol period of the station sync signal. From the head in sequence are arranged a packet ID, a station ID, polling priority data, station sync information, etc. in a predetermined number of bits, respectively. The polling priority data is data relating to the order of priority when transmission is performed under the polling control. The station sync information includes data relating to communicating stations which can be received by that station (data produced on the basis of received state of the station sync signal in the previous one frame) and the like.

The station sync signal transmitted on each slot of the station sync transmit/receive section is processed to receive by each communicating station within the network system. Next, transmissive processing and receptive processing of the station sync signal in the station sync transmit/receive section will be described with reference to FIG. 9. As described above, although the sixteen slots are prepared in the station sync transmit/receive section within one frame, only states of eight slots from slot No. 0 to slot No. 7 are shown herein. Slot No. 8 and thereafter are omitted because they are unemployed. The eight slots from slot No. 0 to slot No. 7 are allotted to the communicating stations 10, 1 to 7 one by one, respectively.

Figure 9:
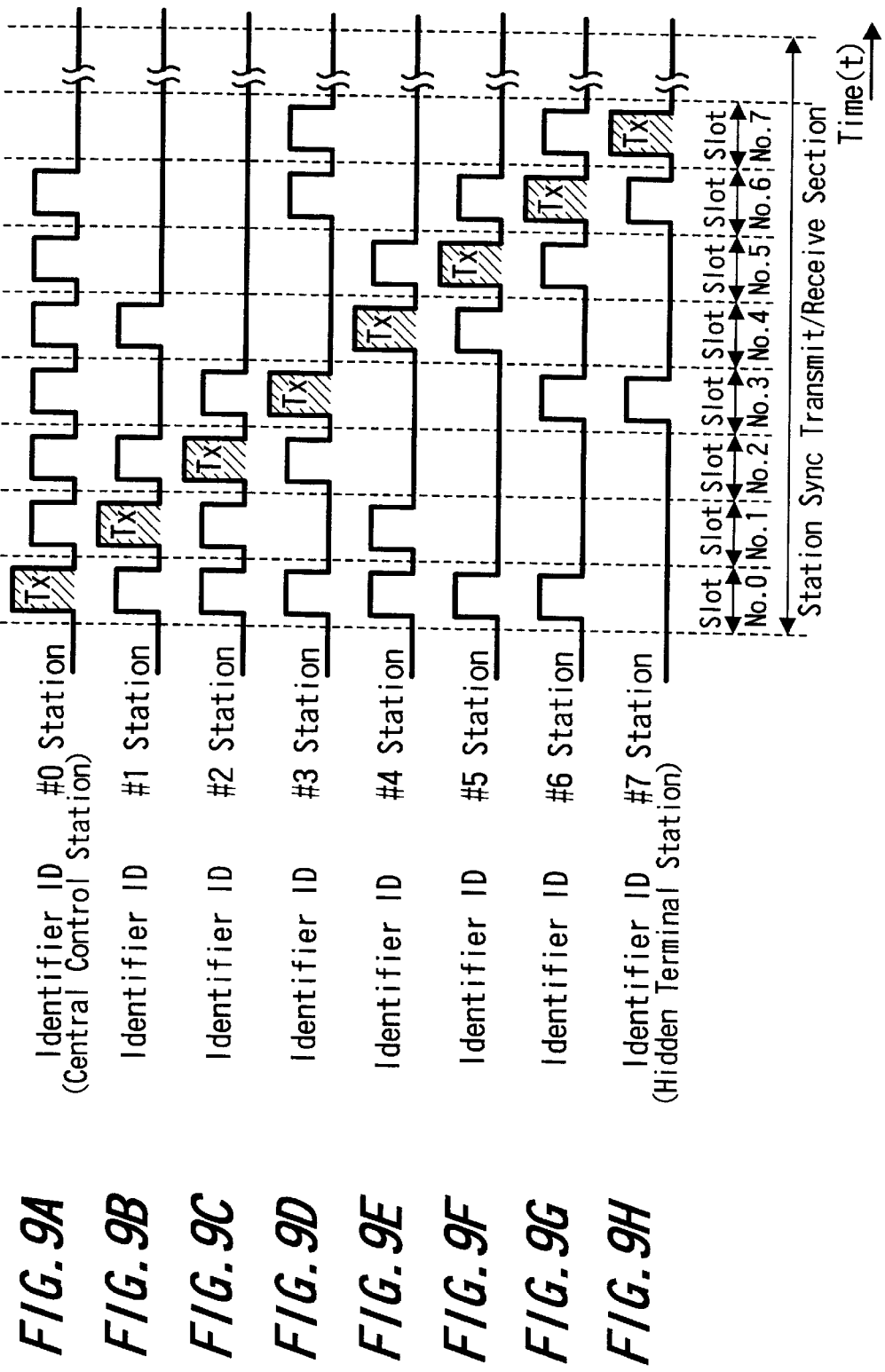
FIGS. 9A thru 9H are timing diagrams showing examples, of transmitting/receiving operation in each station on the station sync transmit/receive section according to an embodiment of the present invention.

FIGS. 9A to 9H show communication states in the station sync transmit/receive section of the eight communicating stations. FIG. 9A shows a state of the communicating station 10 being the central control station. FIGS. 9B to 9H show states in turn from the communicating station 1 to the communicating station 7. In FIG. 9, shaded area shows a state where the radio processing section 22, i.e. a transmitting means of the communicating station performs transmissive processing Tx to transmit by radio from the antenna 21. Other areas which rise like a pulse show a state where a transmitted signal from other communicating station is processed to receive properly by the radio processing section 22, i.e. a receiving means of the communicating station. Areas which do not rise like a pulse show a state where correct reception is impossible (i.e. a state where an attempt to receive fails to decode data correctly).

First of all, the communicating station 10 of identifier ID#0 that is the central control station performs, as shown in FIG. 9A, the transmissive processing Tx of the station sync signal in a section of slot No. 0, and performs the receptive processing in other slots (sections of slot No. 1 and thereafter). In this embodiment, on reception in sections until slot No. 6, because the communicating stations 1 to 6 allotted to those slots are in a position to directly communicate by radio with the communicating station 10, data contained in the received signal can be decoded correctly. On the contrary, in a section of slot No. 7, because the communicating station 7 is not in a position to directly communicate by radio with the communicating station 10, data cannot be received in this slot position. In other words, when the station sync signal is transmitted in slot No. 0 from the communicating station 10 as shown in FIG. 9A, because the communicating stations 1 to 6 of identifier ID #1 to #6 are located within the reach of transmitted signal from the communicating station 10, the station sync signal from the communicating station 10 is correctly received by the communicating stations 1 to 6, whereas the communicating station 7 of identifier ID #7 which is separately located cannot receive the station sync signal from the communicating station 10.

The communicating stations 1 to 7 of identifier ID #1 to #7, as shown in FIGS. 9B to 9H, transmit the station sync signal at slot positions allotted to each communicating station and process to receive at other slot positions. Specifically, the communicating station 1 of identifier ID #1, as shown in FIG. 9B, performs the transmissive processing Tx of the node sync signal at slot No. 1 and processes to receive at other slots. On this occasion, communicating stations adjacent to the communicating station 1 of identifier ID #1 are the communicating stations 10, 2, 4 of identifier ID #0, #2, #4 and so the communicating station 1, as shown in FIG. 9B, can correctly process to receive only the node sync signal transmitted from these nodes at slots No. 0, No. 2 and No. 4.

The communicating station 2 of identifier ID #2, as shown in FIG. 9C, performs the transmissive processing Tx of the station sync signal at slot No. 2 and processes to receive at other slots. On this occasion, communicating stations adjacent to the communicating station 2 are the communicating stations 10, 1, 3 of identifier ID #0, #1, #3 and so the communicating station 2, as shown in FIG. 9C, can correctly process to receive only the station sync signal transmitted from these communicating stations at slots No. 1 and No. 3.

The communicating station 3 of identifier ID #3, as shown in FIG. 9D, performs the transmissive processing Tx of the station sync signal at slot No. 3 and processes to receive at other slots. On this occasion, communicating stations adjacent to the communicating station 3 are the communicating stations 10, 2, 6, 7 of identifier ID #0, #2, #6, #7 and so the communicating station 3, as shown in FIG. 9D, can correctly process to receive only the station sync signal transmitted from these communicating stations at slots No. 0, No. 2, No. 6 and No. 7.

The communicating station 4 of identifier ID #4, as shown in FIG. 9E, performs the transmissive processing Tx of the station sync signal at slot No. 4 and processes to receive at other slots. On this occasion, communicating stations adjacent to the communicating station 4 are the communicating stations 10, 1, 5 of identifier ID #0, #1, #5 and so the communicating station 4, as shown in FIG. 9E, can correctly process to receive only the station sync signal transmitted from these communicating stations at slots No. 0, No. 1 and No. 5.

The communicating station 5 of identifier ID #5, as shown in FIG. 9F, performs the transmissive processing Tx of the station sync signal at slot No. 5 and processes to receive at other slots. On this occasion, communicating stations adjacent to the communicating station 5 are the communicating stations 10, 4, 6 of identifier ID #0, #4, #6 and so the communicating station 5, as shown in FIG. 9F, can correctly process to receive only the station sync signal transmitted from these communicating stations at slots No. 0, No. 4 and No. 6.

The communicating station 6 of identifier ID #6, as shown in FIG. 9G, performs the transmissive processing Tx of the station sync signal at slot No. 6 and processes to receive at other slots. On this occasion, communicating stations adjacent to the communicating station 6 are the communicating stations 10, 3, 5, 7 of identifier ID #0, #3, #5, #7 and so the communicating station 6, as shown in FIG. 9G, can correctly process to receive only the station sync signal transmitted from these communicating stations at slots No. 0, No. 3, No. 5 and No. 7.

The communicating station 7 of identifier ID #7, as shown in FIG. 9H, performs the transmissive processing Tx of the station sync signal at slot No. 7 and processes to receive at other slots. On this occasion, communicating stations adjacent to the communicating station 7 are the communicating stations 3, 6 of identifier ID #3, #6 and so the communicating station 7, as shown in FIG. 9H, can correctly process to receive only the station sync signal transmitted from these communicating stations at slot No. 3 and No. 6.

Thus, the communicating station 10 that is the central control station cannot receive the station sync signal from the communicating station 7 of identifier ID #7 and so it cannot directly recognize the existence of the communicating station 7. However, the communicating station 10 that is the central control station recognizes the existence of the communicating station 7 from information on that station 7, which is contained in the station sync signal from the communicating station 3 of identifier ID #3 as well as the station sync signal from the communicating station 6 of identifier ID #6 and which can be received by the respective stations.

Moreover, the communicating stations 1 to 6 which can directly receive signals from the communicating station 10 that is the central control station decide the slot position for transmission allotted to their own stations based on timing when the station sync signal is received from the communicating station 10. The communicating station 7 which cannot directly receive signals from the communicating station 10 decides the slot position for transmission allotted to its own station based on timing of receiving the station sync signal which can be received by the communicating station 7. In other words, it processes to decide the position of slot No. 7 allotted to its own station from the position of slot No. 3 and the position of slot No. 6.

Next, processing when the control information set for each terminal station within the network is renewed (changed) under the control of the central control station within the network system of the present embodiment will be described. This processing to renew the control information is carried out when a need arises to change control conditions by the central control station due to some factors, for example, when a need arises to alter a utilizing manner of the media information transmitting area.

Figure 10:
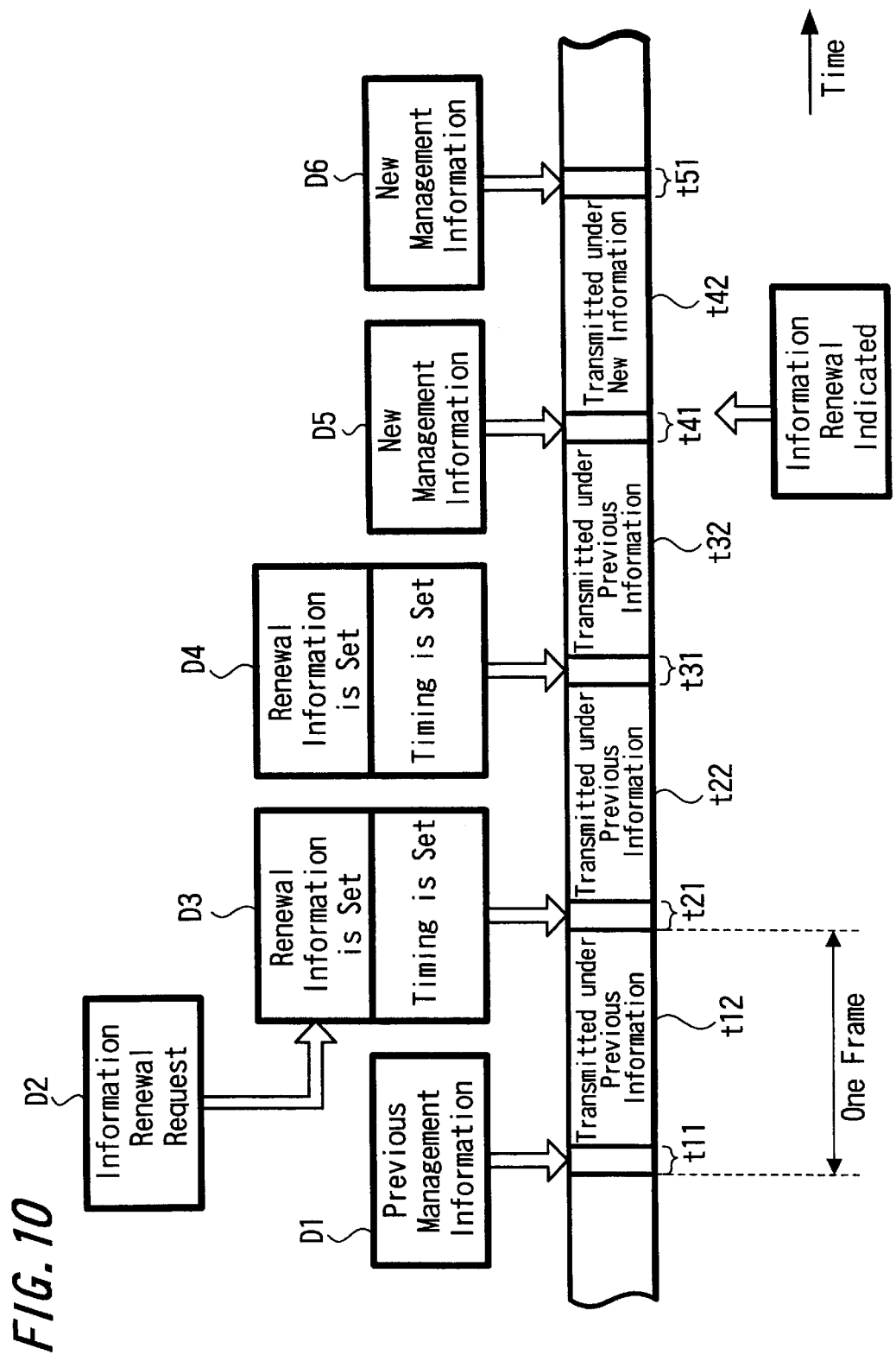
FIG. 10 is a timing diagram showing an example of operation to renew the control information according to an embodiment of the present invention.
Figure 11:
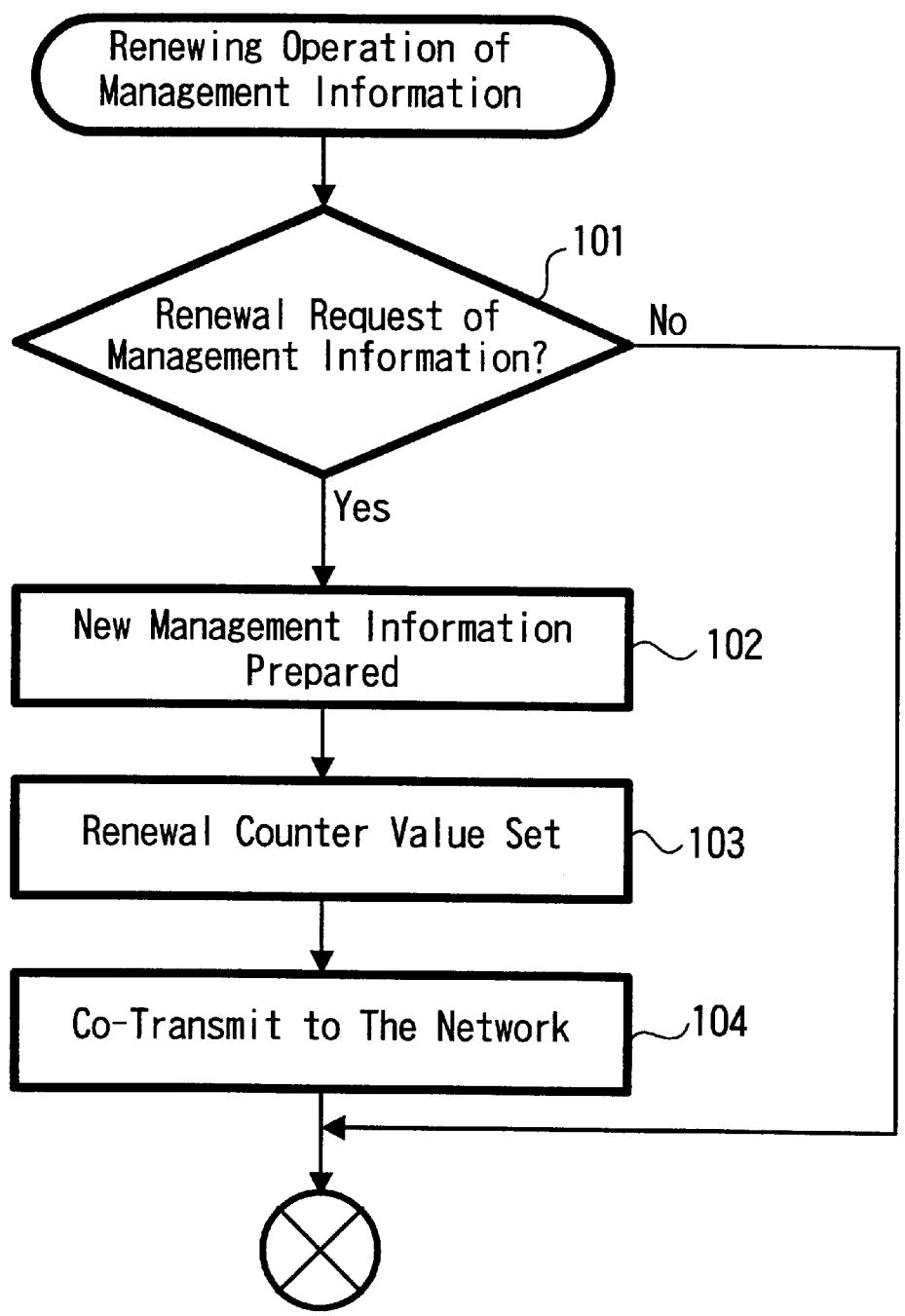
FIG. 11 is a flow chart showing an example of operation to renew the management information according to an embodiment of the present invention.

A timing diagram of FIG. 10 shows the control conditions when renewing the control information. To begin with, it is assumed that the management information transmitted from the radio transmitting apparatus forming the central control station on the management information co-transmit section of each frame has already been stored in the inner memory 26 connected to the controller 25 of the radio transmitting apparatus forming each terminal station and communication within the network is controlled according to that management information. Accordingly, on the management information co-transmit section within a management information transmitting area t11 in the first frame period of time shown in FIG. 10, management information D1 (shown as previous management information in FIG. 10) which is the same management information as that already stored in each terminal station is co-transmitted to each terminal station within the network. And then, data transmission on a media information transmitting area t12 in that frame period of time is carried out under conditions set by the management information which has already been stored in the memory 26 (This management information is herein referred to as previous information.).

In this situation, it is assumed that a request D2 for renewal of control information occurs in the radio transmitting apparatus forming the central control station due to some factors, for example, when a need arises to alter the utilizing manner of media information transmitting area. On this occasion, the controller 25 of radio transmitting apparatus forming the central control station produces control information concerning the renewed contents (renewal information), namely, transmitting data D3 in which data in the predetermined position of information transmitted on the management information co-transmit section within the management information transmitting area t21 in the next frame period of time is made the information on the renewed contents, and transmits it by radio from the central control station. In this case, to the transmitting data D3 is added a timing indicating data under the control of the controller 25. In case of the present embodiment, this timing indicating data is transmitted as the counter data in the data structure of management information co-transmit section shown in FIG. 5. In this example, a count value "1" is used for the counter data.

Each terminal station which receives the information on the management information transmitting area t21 stores the renewal information received at that time in the inner memory 26 connected to the controller 25. However, the management information already stored in the inner memory 26 (previous information) is, at this time point, left stored as it is. The received counter data is set on the counter provided in the controller 25. In this example, the count value "2" is set. Communication with each terminal station on a media information transmitting area t22 in the same frame period of time following the management information transmitting area t21 is controlled by using the previous information.

On a management information transmitting area t31 in the next frame period of time, the controller 25 of radio transmitting apparatus forming the central control station produces transmission data D4 containing the same management information as that transmitted in the just prior frame period of time and transmits it by radio from the central control station. However, in case of this frame period of time, counter data in which a unit value is subtracted from data of the just prior frame period of time forms the timing indicating data. Particularly, because the timing indicating data of the just prior frame period of time is the counter data of count value "2" in this example, the counter data of count value "1" forms the timing indicating data.

Each terminal station which receives the information on the management information transmitting area t31, when deciding that renewal information received then is the same as the renewal information transmitted in the just prior frame period of time, waits under the same control condition as it is. While the received counter data, i. e. the time indicating data is not set on the counter at that time, because one frame has passed since the counter data of count value "2" was set, the count value of counter provided in the controller 25 is counted down to "1". Communication with each terminal station on a media information transmitting area t32 in the same frame period of time following the management information transmitting area t31 is controlled by using the previous information.

On management information transmitting areas t41, t51, etc. in the subsequent frame periods of time, the controller 25 of the radio transmitting apparatus forming the central control station produces transmission data D5, D6, etc. in which the control information having the renewed contents is made the management information and transmits them by radio at every one frame from the central control station. On this occasion, the counter data is not transmitted.

In this case, at a timing when the control information D5 is transmitted on the management information transmitting area t41, one frame has passed from the just prior frame period of time, so that the count value of the counter provided in the controller 25 is counted down to "0". When this count value has become "0", the renewal information stored in the memory 26 connected to the controller 25 of each terminal station is read out to renew the communication state of that terminal station by the renewal information. Thus, communication at each terminal station on the media information transmitting area t32 for this frame period of time goes into a transmission state where the new information is used. This new information using transmission will be performed for each frame period of time until the next renewal information is transmitted and set.

In addition, the same value as that of the counter data transmitted is set also on the counter provided in the controller 25 of the transmitting apparatus forming the central control station. When the count value has become 0, the management information used for the communication control is renewed to new information from the previous information in the same way as in the case of terminal station.

To the communicating station 7 of identifier ID #7 which is a terminal station that cannot directly communicate with the central control station existing in the network structure of the present example shown in FIG. 1 and FIG. 2, for example, the communicating station 3 of identifier ID #3 or the communicating station 6 of identifier ID #6 which is able to communicate with the communicating station 7 relays the renewal information to the communicating station 7 on the media information transmitting area t22 or t32. On this occasion, the counter data set on that communicating station which relayed is added thereto.

In this manner, the renewed management information is transmitted by radio from the central control station to each terminal station within the network while the timing for the management information to be renewed is specified. When the specified time has come, the management information is automatically renewed to that transmitted information.

Processings in both the central control station and each terminal station when processing to renew the management information will now be described with reference to flow charts. First of all, the renewing operation of management information in the central control station will be described with reference to a flow chart of FIG. 11. The controller 25 of radio transmitting apparatus forming the central control station estimates whether the renewal request of management information is made or not (step 101). When no renewal request is made, the processing here is made to an end. When any renewal request is made, it prepares new management information based on that request (step 102) and also sets the count value for specifying the renewal timing (step 103). Thereafter, it co-transmits the prepared new management information and the counter data to each terminal station within the network on the management information co-transmit section (step 104).

Figure 12:
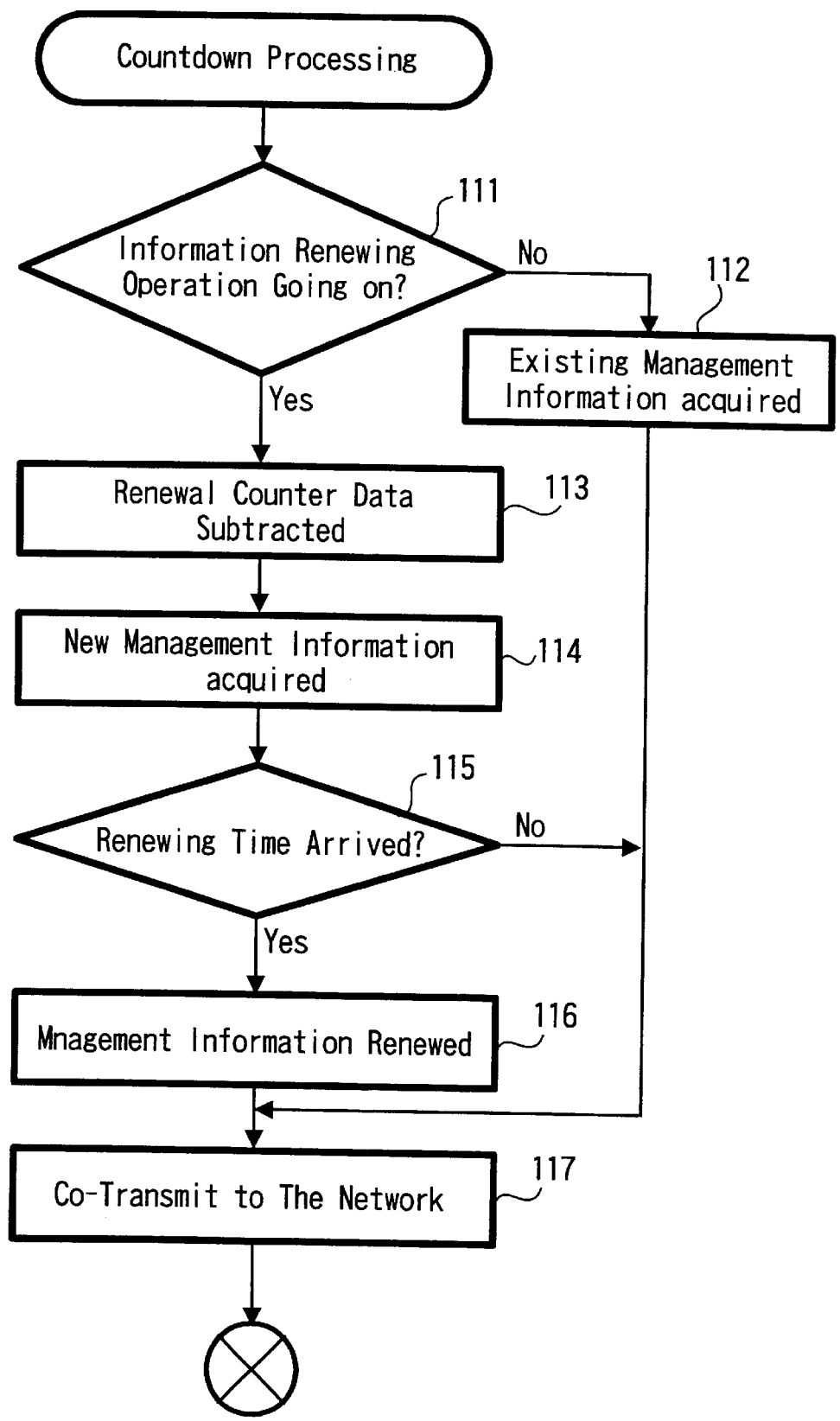
FIG. 12 is a flow chart showing an example of processing to renew the management information according to an embodiment of the present invention.

After this co-transmission of renewed information is performed, a countdown processing of the management information is entered. A flow chart of FIG. 12 shows this countdown processing of management information. The controller 25 of radio transmitting apparatus forming the central control station estimates whether of not the renewing operation of information is going on (step 111) and when the renewing operation of information is not going on, it acquires the existing management information (step 112) and co-transmits the existing management information (previous management information) on the management information co-transmit section of each frame (step 117).

When it is estimated that the renewing operation of information is going on at step 111, the counter data for renewal is subjected to a subtraction processing (step 113) and the controller 25 acquires the renewed management information already prepared at step 102 and waits (step 114). On this occasion, the counter data subtracted at step 113 is added to the prepared renewal management information.

The controller 25 estimates whether or not the count value subtracted at step 113 reaches 0 (i.e. the renewing timing has arrived). If it decides that the renewing timing has arrived, it renews, with the prepared renewal information, information used by the central control station for network management (step 116) and co-transmits the renewed management information to each terminal station within the network on the subsequent management information co-transmit sections (step 117).

If it decides at step 115 that the renewing timing has not arrived, then it moves to step 117 and co-transmits the same management information as that transmitted on the management information co-transmit section of the just prior frame period of time (however, the counter data is the value subtracted at step 113.) to each terminal station within the network.

Figure 13:
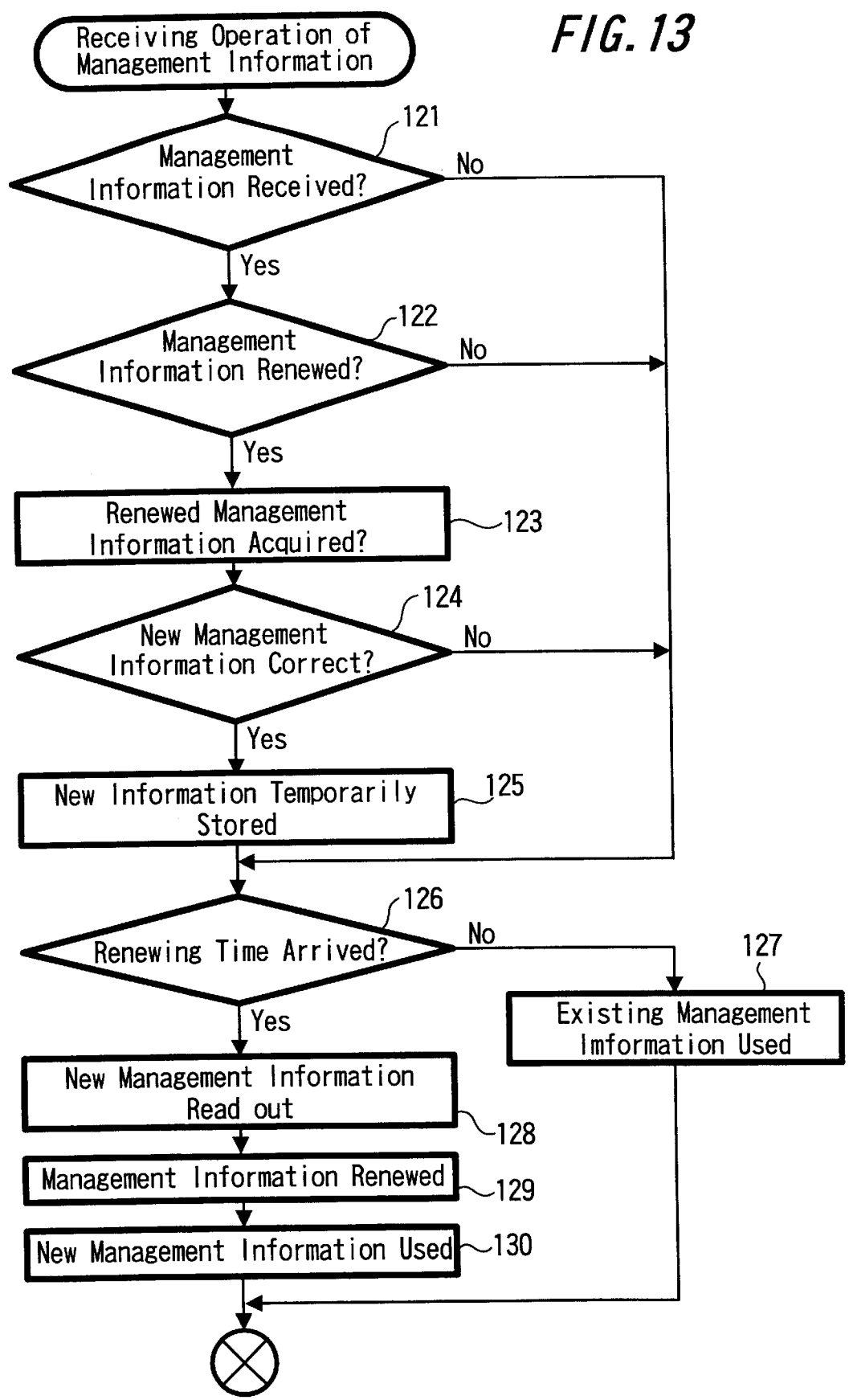
FIG. 13 is a flow chart showing an example of operation to receive the management information according to an embodiment of the present invention.

Next, processing on the side of terminal station to receive the management information transmitted from the central control station in this manner will be described with reference to FIG. 13. First of all, the terminal station estimates whether or not the management information has been received (step 121). When the management information has been received, it decides whether or not the received management information is renewed information (step 122). When it decides that the received management information is the renewed information, it processes to acquire the renewed management information by the controller 25 of terminal station (step 123) and estimates whether or not the acquired management information is correct management information which is free from reception error, etc. (step 124). If renewed management information is obtained correctly here, it stores the renewed and new management information in the memory 26 connected to the controller 25 (step 125). On this occasion, the counter data contained in received data estimated by the controller 25 is set on the counter provided in the controller 25. A count value of this counter is counted down in synchronism with the frame cycle period.

After this new management information has been stored, the count value of the counter provided in the controller 25 is estimated as to whether or not the count value reaches 0 (i.e. the renewing timing has arrived) (step 126). When it is estimated that the management information is not received at step 121, when it is estimated that there is no renewal information at step 122, and also when it is estimated that the renewal information is not correctly received at step 124, the operation moves to the estimation at step 126.

When it is decided that the renewing timing has not arrived at step 126, the controller 25 causes communication control processing using the existing management information (i.e. the management information which has previously been stored in the memory 26) to be performed (step 127). When it is decided that the renewing timing has arrived at step 126, the controller 25 reads out the renewal information stored in the memory 26 at step 125 (step 128) and controls to perform, with the readout renewal information, the processing to renew the management information which is used by each terminal station for communication control (step 129). Thereafter, the processing for communication control using the renewed management information is performed (step 130).

By performing the processings in the central control station and the terminal station in this way, the renewing operation described with FIG. 10 is executed. By performing to renew control information (management information) in this manner, the renewed information and its renewal timing information are transmitted several frames before the renewal is actually made (for the above example, two frames before) for executing the renewing operation. Therefore, even though some terminal station within the network fails to catch specific renewal information, if it can receive the renewal information transmitted on the next frame, the information will then be renewed with the specified frame timing.

Moreover, even if, e.g. in a network where a plurality of terminal stations exist, there is a state in which the line's quality on radio transmission path is not satisfactory temporally or spatially, it is possible to set the timing for renewing information to a simultaneous specific timing among all stations existing in the network. For this reason, there is no need for processing to request the return of response signal as before and so it is possible to renew the control information simultaneously by simple control.

Furthermore, although the above described network structure is such that the terminal station 7 exists therein which is unable to directly communicate by radio with the central control station, in this case also it is possible to transmit the renewal information and timing information to the terminal station 7 by relayed transmission via other terminal station while the renewal information is transmitted and then the renewal timing arrives. Therefore, even though the network structure includes any terminal station which is unable to directly communicate by radio with the central control station, the simultaneous renewal of control information is enabled.

In addition, when the radio transmitting apparatus forming the central control station and each terminal station, for example, comprises a plurality of antenna and is constructed as a so-called antenna diversity operating apparatus in which an antenna for transmission and an antenna for reception are appropriately switched, even if, for example, an optimum antenna is not selected with some timing and the optimum antenna is selected with another timing, there will be a higher possibility for each terminal station to appropriately receive the renewal information and timing information by transmitting the renewal information a plurality of times, thus allowing the control information to be renewed satisfactorily.

In this way, the renewal processing of control information according to the present embodiment is applicable to variously constructed networks such as the network including multiple terminal stations, the network including any movile terminal station, the network including any terminal station which is unable to directly communicate with the central control station, the network including any terminal station making the antenna diversity operation and so on. This allows a free network construction by radio.

Further, although the above described embodiment uses as the renewal timing information the count value data of counter which counts down at a frame cycle, the count value data may be those of counter which counts down with reference to other timing. Moreover, it may be arranged that the renewing operation is performed when the count value of a counter that makes countup operation in which the value is added by a fixed value reaches a predetermined value.

Figure 14:
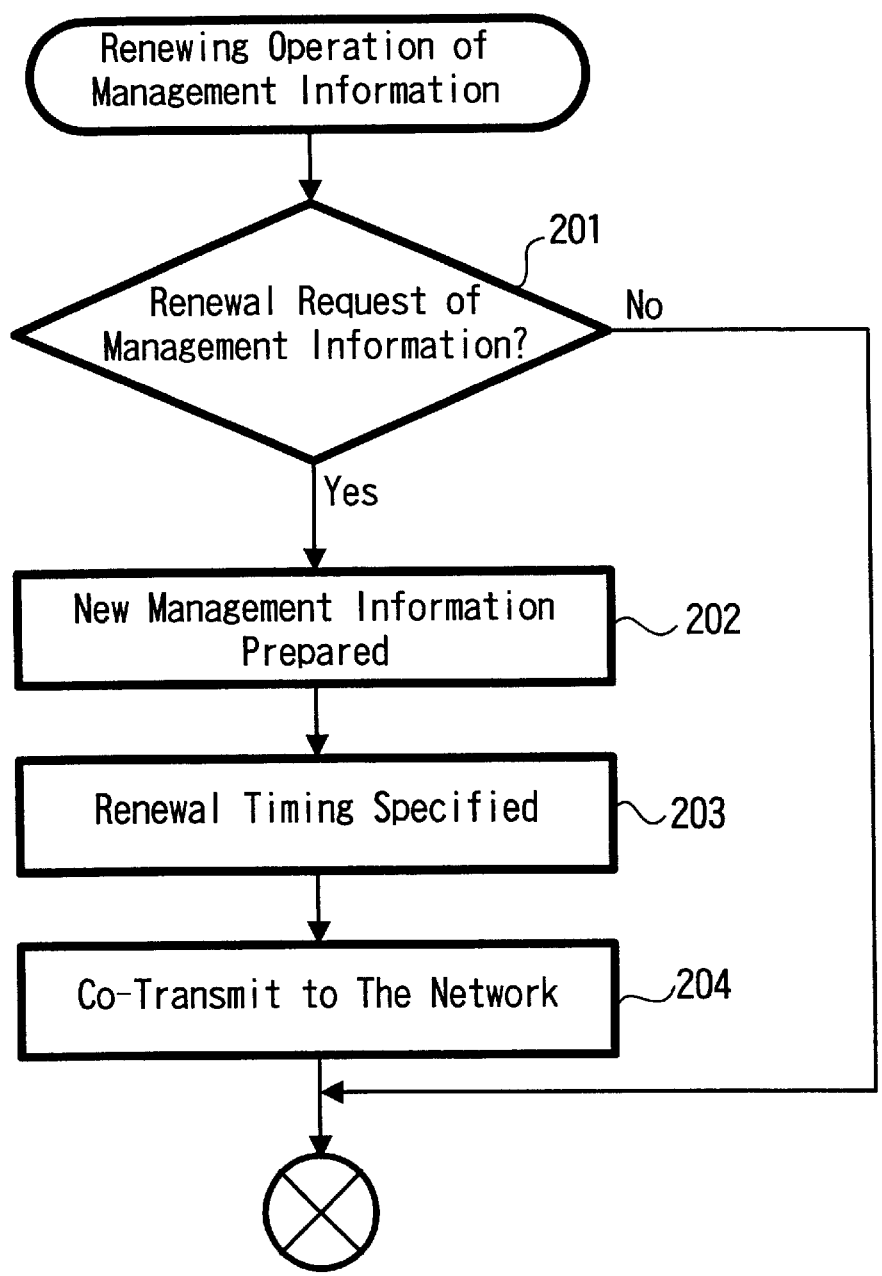
FIG. 14 is a flow chart showing an example of operation to renew the management information (an example where the timing is specified with an absolute value) according to an embodiment of the present invention.
Figure 15:
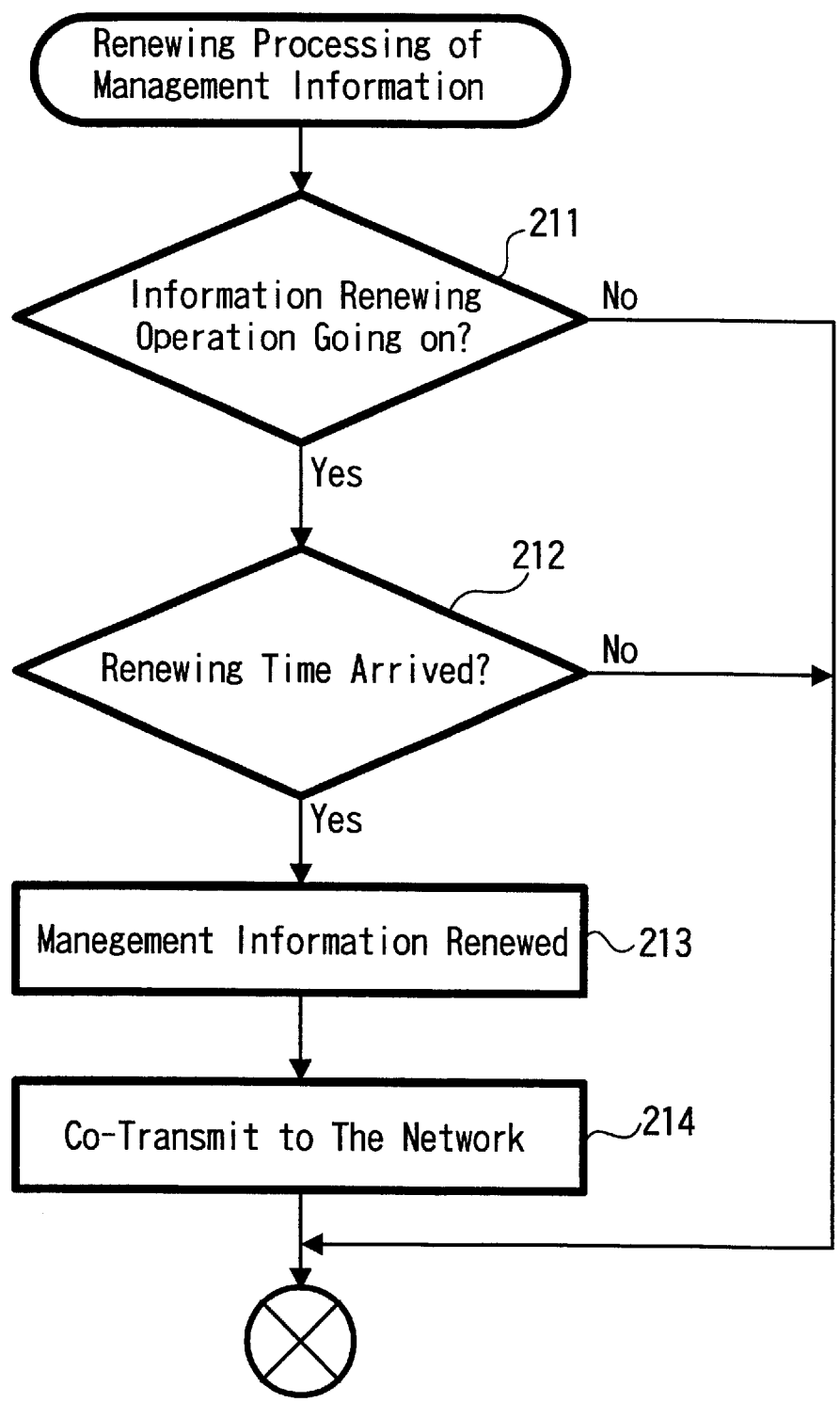
FIG. 15 is a flow chart showing an example of processing to renew the management information according to another embodiment of the present invention.
Figure 16:
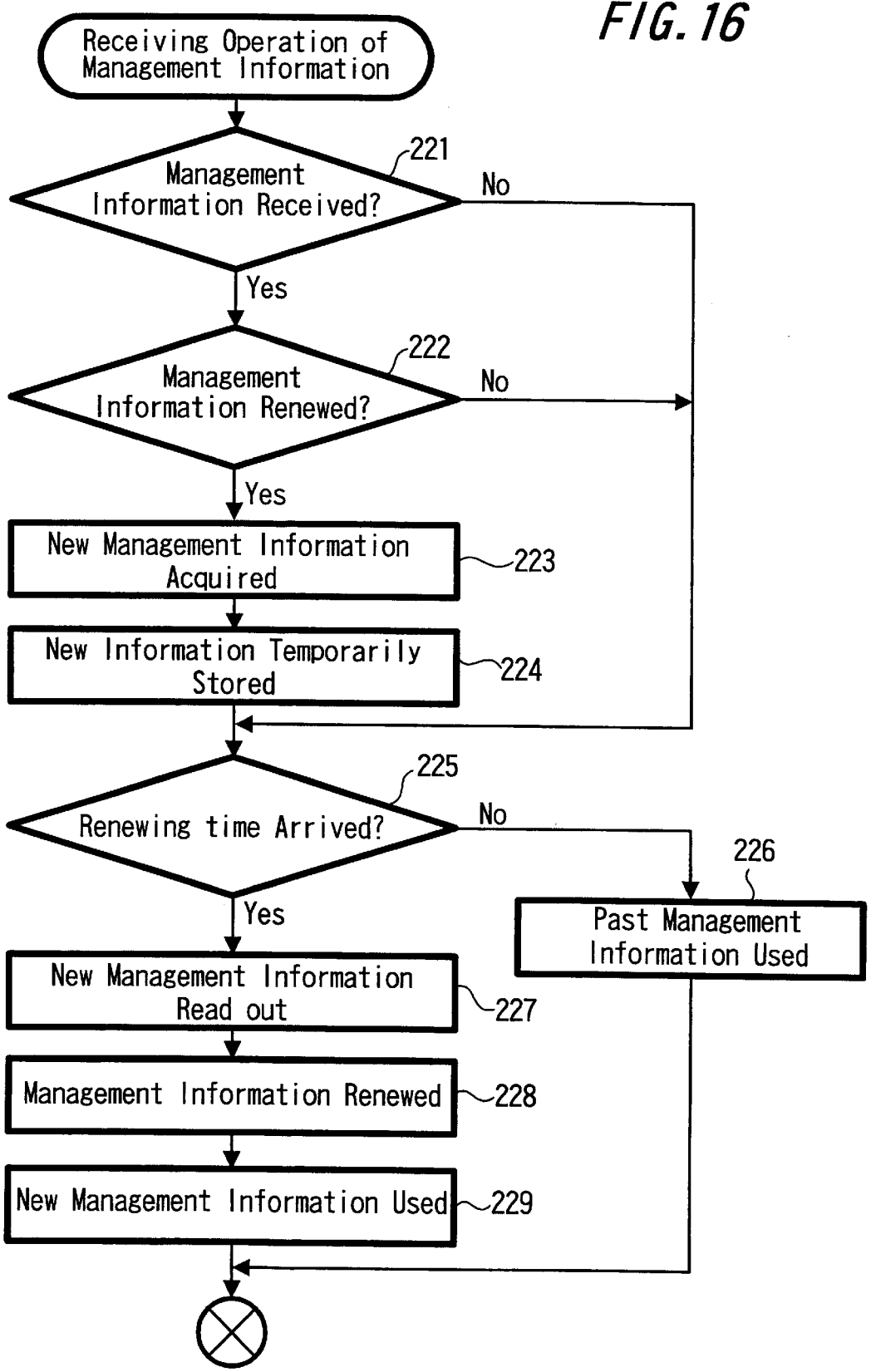
FIG. 16 is a flow chart showing an example of operation to receive the management information according to another embodiment of the present invention.

Additionally, in stead of setting the renewal timing by such processing of counter's count, it may be arranged that the central control station specifies an absolute renewal timing. Flow charts of FIG. 14 to FIG. 16 show an example of the renewal processing when the central control station specifies the absolute renewal timing. To begin with, the renewing operation of management information by the central control station will be described with reference to the flow chart of FIG. 14. The controller 25 of radio transmitting apparatus forming the central control station estimates whether or not there is a request of renewing the management information (step 201). When there is no request of renewal, it finishes its processing. When there is the request of renewal, it prepares new management information based on that request (step 202) and also produces data for specifying the absolute renewal timing (step 203). Subsequently, it co-transmits these prepared new management information and timing specifying data to each terminal station within the network on the management information co-transmit section (step 204).

After the renewal information has been co-transmitted, a timing specified management information renewing processing starts. The flow chart of FIG. 15 shows this timing specified management information renewing processing. The controller 25 of radio transmitting apparatus forming the central control station estimates whether or not the information renewing operation is going on (step 211). When the information renewing operation is going on, it decides whether or not the renewing timing specified at step 203 has arrived (step 212). When the renewing timing has arrived, it renews, with the prepared renewal information, information used by the central control station for network management (step 213) and co-transmits the renewed management information to each terminal station within the network on the subsequent management information co-transmit sections (step 214).

Processing on the side of terminal station receiving the management information transmitted from the central control station enters a state shown in a flow chart of FIG. 16. Specifically, the terminal station estimates whether or not the management information is received (step 221). When the management information is received, it estimates whether or not the received management information is the renewed information (step 222). If it decides that the received management information is the renewed information, then it processes to acquire that renewed management information by the controller 25 of terminal station (step 223) and causes the memory 26 connected to the controller 25 to store the acquired new management information (step 224).

After the new management information has been stored, the controller 25 decides whether or not the timing specified by the timing specifying data contained in the received new information has come (i.e. renewing timing has arrived) (step 225). When it decides that the management information is not received at step 221 and also when it decides that there is no renewed information at step 222, the operation moves to step 225 for decision.

When it is decided at step 225 that the renewing timing has not arrived, the controller 25 causes communication control processing using the existing management information (i.e. management information that has previously been stored in the memory 26) to be performed (step 226). When it is decided at step 225 that the renewing timing has arrived, the controller 25 reads out the renewal information stored in the memory 26 at step 224 (step 227) and controls to perform, with the readout renewal information, the processing to renew the management information which is used by each terminal station for communication control (step 228). Thereafter, the processing for communication control using the renewed management information will be performed (step 229).

In this way, by specifying the absolute renewal timing from the central control station, the same renewing processing as that of the above described embodiment is also possible. Additionally, as the absolute renewal timing data, for example, time information such as hour, minute and second, information such as frame number or the like used in the network and the like are considered.

Figure 17:
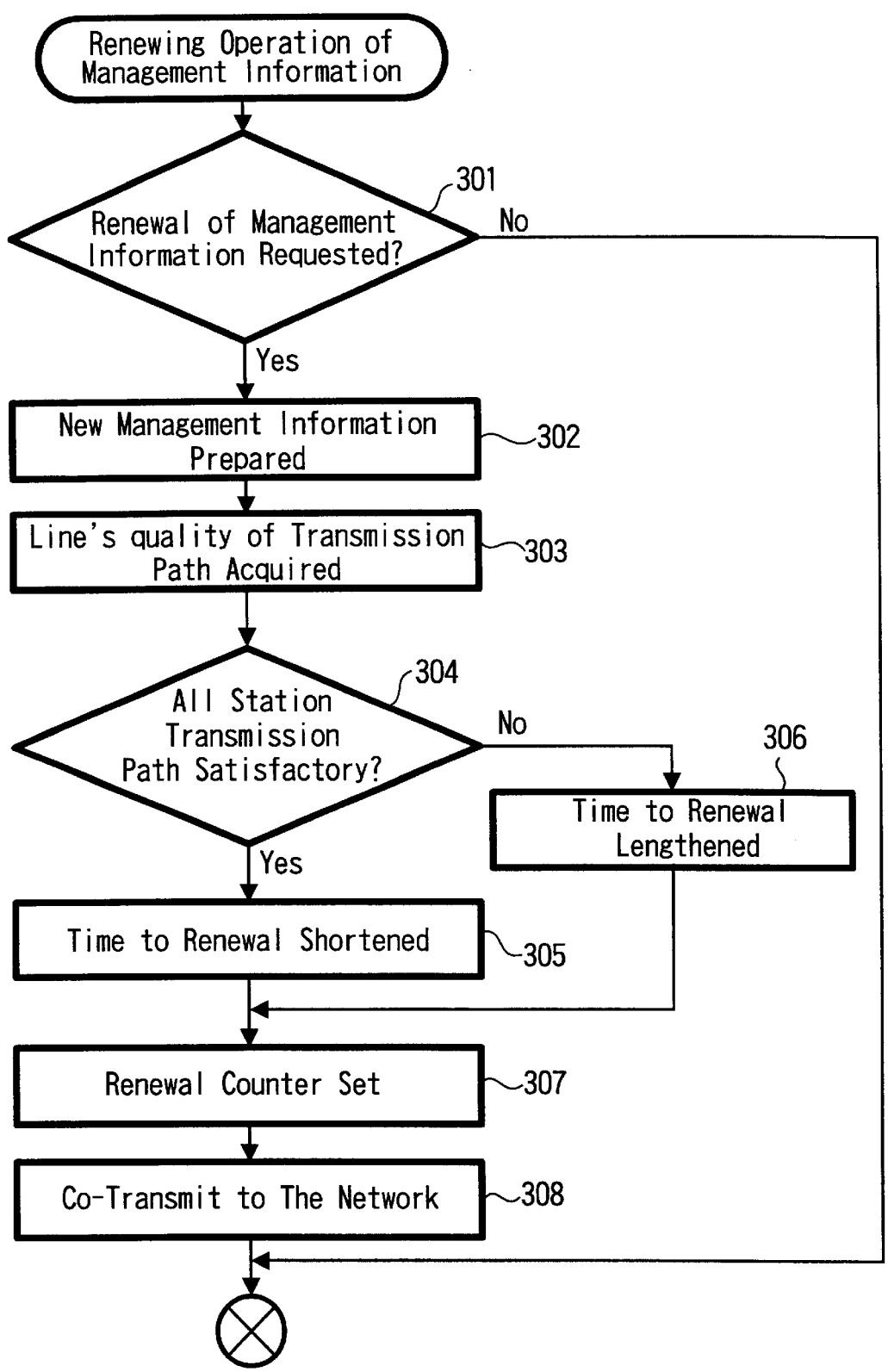
FIG. 17 is a flow chart showing an example of operation to renew the management information according to still another embodiment of the present invention.

Although, in the aforesaid embodiment, the description has been made on the premise that a time taken from when the renewal of management information is requested to when the management information is renewed is a fixed time, the time taken to the renewal may be set to be variable depending on the state at that time. For example, the time may be set variable depending on the line's quality of radio transmission path at that time. FIG. 17 shows an example where the timing taken to the renewal is set variable depending on the line's quality of radio transmission path, which is executed under the decision of the controller 25 of radio transmission apparatus forming the central control station. In this case, the controller 25 has a surveillance function to watch the radio transmission conditions (the line's quality) with terminal stations within the network. This surveillance function of the line is a function to decide them, e.g. from a error rate of data transmitted from the terminal station or a variation of reception level and so on.

Describing according to a flow chart of FIG. 17, it is first estimated whether or not there is the renewal request of management information (step 301) and when there is the renewal request, new management information based on the renewal request is prepared (step 302). Next, the controller 25 acquires information on the line's quality of the present transmission path (step 303).

It is then estimated whether or not the present conditions are such that the line's quality of radio transmission path between all terminal stations is satisfactory (step 304). When all lines are satisfactory, the time taken to the renewal of management information will be shortened (step 305). When it is estimated at step 304 that there are unsatisfactory lines, the time taken to the renewal of management information will be set longer (step 306).

Subsequently, a value of counter for renewal is set based on the set time (step 307). Concerning the count value that is set at this time, for example, when a short time is set at step 305, a relatively small value is set as the initial value and when a long time is set at step 306, a relatively large value is set as the initial value. The thus set counter data and renewed information are co-transmitted to the network on the management information co-transmit section (step 308).

By performing the renewing operation in this manner, the central control station is able to set the appropriate timing depending on the line's quality at that time. In addition, although the variable timing is set due to the line's quality in the flowchart of FIG. 17, instead of the estimation of line's quality at steps 303, 304, the other factor may be estimated to set variable of the time taken to the renewal on the basis of that estimation. For example, when the central control station recognizes that, as the network structure shown in FIG. 1 and FIG. 2 of the aforesaid embodiment, there is a terminal station which is unable to communicate by radio directly with the central control station, a long time may be set for the time taken to the renewal.

Additionally, the frame structure described with the aforesaid embodiment shows only one appropriate example and the present invention is not limited to that frame structure. Various frame structures suitable for transmission system and the like applied to the network system can be employed. For example, although the management information transmitting area comprised of the management information co-transmit section and the station sync transmit/receive section is arranged at the head of each frame in the example shown in FIG. 4, it may be arranged in another position within one frame.

Moreover, although the aforesaid embodiment has the structure that the management information transmitting area is rovided in all frames, it may be arranged that one management information transmitting area is provided for every redetermined number of frames to transmit the management information and the station sync information.

Furthermore, although the aforesaid embodiment has the structure that the frame cycle is defined based on the management information transmitted from the central control station on the management information transmitting area, it may be arranged that the frame cycle is defined by other signal.

According to the transmission controlling method, because, in each communicating station, the previously transmitted renewed information is set and then the control information is renewed simultaneously by the set renewed information with the specified timing, it will be possible to renew the control information simultaneously in all communicating stations within the network. Therefore, by the simple processing only to co-transmit the renewed information and timing information from the control station to each communicating station, it will be possible to perform the satisfactory processing to renew the control information.

According to the transmission controlling method, because, in the invention, the control station transmits the renewed control information in a manner to repeat a plurality of times until that control information is renewed, it will be sufficient for each communicating station to be able to receive correctly at least once the renewed information transmitted a plurality of times, even if there may be a temporary reception error of the renewed information, which allows the renewed information to be securely transmitted to each communicating station.

According to the transmission controlling method, because, in the invention set forth in claim 1, the timing information transmitted by the control station is made the count value information, the communicating station which receives this count value information counting down or counting up from the count value specified by that information and causing the control information to be renewed when the value counted down or counted up becomes the predetermined value, it will be possible to set the renewal timing by the simple processing using the count value.

According to the transmission controlling method, because, in the invention set forth in claim 3, the control information is transmitted cyclically with reference to the frame cycle set by the control station and the countdown or countup of the count value is carried out with the frame cycle as a unit, it will be possible for the communicating station renewing the control information to set the renewal timing simultaneously with managing the frame cycle, thus simply enabling the renewal timing in each communicating station to be coincided correctly.

According to the transmission controlling method, because, in the invention set forth in claim 1, the control station estimates the line's quality on transmission path and varies the timing for renewing the control information depending on the estimated line's quality, it will be possible to ensure the time taken to when the renewed information can be transmitted to all communicating stations within the network, in whichever conditions the line's quality on that occasion may be. Also, when the line's quality is satisfactory, it will be possible to renew the control information in a short time by the renewed information.

According to the transmission control apparatus, when controlling to renew the control information for other transmission apparatus within the network, it will be possible to specify the timing for renewing the control information, thereby allowing the control to renew the control information simultaneously by all stations within the network to be simply performed.

According to the transmission control apparatus, because, in the invention, the timing information given by the time specifying means is made the countdown information indicating the count value until the time renewed, it will be possible to simply specify the correct renewal timing only by transmitting the count value.

According to the transmission control apparatus, because, in the invention, the time specifying means estimates the line's quality within the network and varies the timing for renewing the control information depending on the estimated line's quality, it will be possible to ensure the necessary time for transmitting the renewed information to all stations within the network appropriately depending on the line's quality on that occasion. This makes it possible to control for setting the correct control information on each station.

According to the transmitting apparatus, it will be possible to renew the control information by the previously received renewed information with the timing specified by the control apparatus, thus allowing the processing to renew the control information under the control of the control apparatus to be performed without fail.

According to the transmitting apparatus, because, in the invention, the control means has the counter whose count value changes at every predetermined cycle, sets the count value obtained as the timing information on the counter and controls to renew the control information to the renewed information when the set count value becomes the redetermined value, it will be possible to simply set the correct renewal timing only by setting the count value on the counter.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A transmission controlling method for renewing control information in a communication system where an access for transmission between a plurality of communicating stations of the communication system is executed based on the control information transmitted from a control station of the communication system, comprising the steps of:

causing said control station to transmit renewal control information and to transmit timing information relating to a time of occurrence of renewal prior to the time of occurrence of the renewal, and causing said plurality of communicating stations to renew said control information based on received renewal control information at the time of occurrence set by the received timing information, wherein said timing information transmitted by said control station is count value information, and further comprising the step of:

causing said communicating station which receives the count value information to count down or to count up from a count value specified by said count value information and to renew said control information with the renewal control information when the counted-down or counted-up value becomes a predetermined value.

2. A transmission controlling method according to claim 1, comprising the further step of:

causing said control station to transmit the renewal control information repeatedly for a plurality of times until said control information is renewed.

3. The transmission controlling method according to claim 1, comprising the further step of:

transmitting said renewal control information cyclically with reference to a frame cycle set by said control station and carrying out the counting-down or counting-up of said count value with said frame cycle as a unit.

4. A transmission controlling method for renewing control information in a communication system where an access for transmission between a plurality of communicating stations of the communication system is executed based on the control information transmitted from a control station of the communication system, comprising the steps of:

causing said control station to transmit renewal control information and to transmit timing information relating to a time of occurrence of renewal prior to the time of occurrence of the renewal, and causing said plurality of communicating stations to renew said control information based on received renewal control information at the time of occurrence set by the received timing information, wherein said control station estimates a quality of a transmission path and varies a time taken to renew said control information with the renewal control information depending on an estimated quality of the transmission path.

5. A transmission control apparatus for controlling access by a transmitting apparatus within a communication network, comprising:

renewal information producing means for producing renewal control information for renewing control information that controls said access by the transmitting apparatus, time specifying means for providing timing information that specifies a time of occurrence of renewal of the control information using the renewal information produced by said renewal information producing means, and transmitting means for transmitting said renewal information produced by said renewal information producing means and transmitting said timing information provided by said time specifying means, wherein said time specifying means includes means for providing countdown information indicating a count value until the renewal is performed.

6. A transmission control apparatus for controlling access by a transmitting apparatus within a communication network, comprising:

renewal information producing means for producing renewal control information for renewing control information that controls said access by the transmitting apparatus, time specifying means for providing timing information that specifies a time of occurrence of renewal of the control information using the renewal information produced by said renewal information producing means, and transmitting means for transmitting said renewal information produced by said renewal information producing means and transmitting said timing information provided by said time specifying means, wherein said time specifying means includes means for estimating a quality of the transmission path within the network and for varying the time of occurrence of renewal of said control information depending on the estimated quality.

7. A transmitting apparatus comprising:

communicating means for performing transmission and reception with other units of transmitting apparatus and for receiving renewal control information and timing information relating to a time of occurrence of renewal from a control apparatus, and control means for determining whether control information received by said communicating means contains renewal information and timing information and for renewing the control information based on said renewal information at a timing specified by said timing information, wherein said control means includes a counter whose count value varies at every predetermined cycle, and wherein said control means sets a count value obtained as said timing information on said counter and controls, when the set count value becomes a predetermined value, said control information to be renewed by said renewal control information.

* * * * *